United States Patent [19]

Newitt

[11] 3,935,383

[45] Jan. 27, 1976

[54] STORAGE OF A REPRESENTATION OF AN IMAGE

[76] Inventor: John H. Newitt, 123 Puritan Lane, Sudbury, Mass. 01776

[22] Filed: July 19, 1974

[21] Appl. No.: 490,035

[52] U.S. Cl. ................................................ 178/7.2
[51] Int. Cl.² ........................................... H04N 5/38
[58] Field of Search ............... 178/DIG. 28, 7.2, 6.8; 340/173 LT, 173 CR

[56] References Cited
UNITED STATES PATENTS

| | | | |
|---|---|---|---|
| 3,621,130 | 11/1971 | Paine .................................. | 178/7.2 |
| 3,715,489 | 2/1973 | Brown et al. ..................... | 178/6.8 X |
| 3,718,757 | 2/1973 | Gulitz et al. ........................ | 178/6.8 |
| 3,740,466 | 6/1973 | Marshall et al. .................... | 178/6.8 |

*Primary Examiner*—Griffin Robert L.
*Assistant Examiner*—Mitchell Saffian

[57] ABSTRACT

A television camera which scans an image provides a camera video signal having an amplitude representative of light received from an element of the image being scanned. Prior to a scan a sync pulse is generated which increments a raster counter. Accordingly, the roster counter provides a signal representation of a cumulative number of scans of the image. During the scanning, clock pulses increment a horizontal deflection counter which provides a signal representation of a horizontal deflection number corresponding to the horizontal coordinate of the line of sight. When the cumulative number of scans equals the horizontal deflection number, a comparator provides a gating signal which causes a sample and hold circuit to store a sampled video signal having an amplitude equal to the amplitude of the camera video signal. The sampled video signal is provided to the input of an analog to digital converter for conversion to digital signals which may be stored in a digital computer. A succession of sampled video signals is representative of the image when the cumulative number of scans exceeds a maximum horizontal deflection number.

1 Claim, 3 Drawing Figures

STORAGE OF A REPRESENTATION OF AN IMAGE

BACKGROUND OF THE INVENTION

1. Field of the Invention

This invention relates to data processing and more particularly to storing signals representative of an image.

2. Description of the Prior Art

Recently there has been a plethora of scientific activity directed to processing an input image to provide, for example, a processed image which is comprised of desired features of the input image. A signal representation of the input image may be stored in a digital computer which provides a signal representation of the processed image. The input image is usually provided on an image bearing medium, such as a film.

When a television camera scans an image, an array of closely spaced parellel lines, known as a raster, may be regarded as being successively traced on the film by a line of sight therefrom to the camera. The camera provides a video signal having an amplitude representative of an element of the input image on the film at an intersection thereof with the line of sight. The video signal is provided to an analog to digital converter which is connected to the computer.

In response to the video signal, the converter provides a group of digital signals collectively representative of the amplitude of the video signal. Accordingly, the video signal is converted to digital signals whereby a signal representation of the element is provided to the computer for storage therein.

A digital signal may have one of two values, referred to as ONE and ZERO, respectively. ONE is typically represented by approximately five volts whereas ZERO is typically represented by approximately zero volts. It should be appreciated that the digital computer can only store digital signals (not video signals).

It should be understood that the video signal is one of a multiplicity of video signals provided by the camera during the tracing of the raster. The multiplicity of video signals are respectively representative of substantially all elements comprising the input image. Each one of the multiplicity of video signals is converted to a group of digital signals by the converter whereby the computer stores groups of digital signals representative of the input image.

Typically, the multiplicity of video signals is provided to a television monitor display. In response to the multiplicity of video signals the monitor display provides a visual representation of the input image.

In commercial television, it is a standard practice to trace in one sixtieth of a second a raster comprised of raster lines which are each traced in 53 microseconds. It is usually desirable to provide a display representative of at least 450 elements along a raster line. To successively provide groups of digital signals respectively representative of the 450 elements along a standard raster line, the converter operates rapidly. The rapid operation causes the converter to be complex, expensive and unreliable.

When the raster is traced at a rate slower than one sixtieth of a second, the converter operates at a correspondingly slower rate. However, the visual representation (on the monitor display) may appear to flicker.

SUMMARY OF THE INVENTION

An object of the present invention is to represent an image with digital signals which may be stored in a computer.

Another object of the present invention is to represent an image with digital signals which may be stored in a computer and concurrently provide a visual representation of the image which does not appear to flicker.

Another object of the present invention is to provide digital signals representative of elements of an image scanned by a television camera in accordance with standard television practice, the logic signals being of a type which may be stored in a computer.

According to the present invention, when a video generator scans an image, input video signals are provided which are representative of respective elements of said image along a line thereof; in response to said input video signals, a network provides for a desired duration a sampled video signal representative of a selected element; when a known number of rasters are traced, sampled video signals are provided which are representative of said image.

The invention may be utilized to provide a sampled video signal during a time greater than the time for the tracing of a raster line in accordance with standard television practice, where the sampled video signal is representative of an element of an image. Sampled video signals respectively representative of elements of the image are thereby provided at a rate suitable for conversion to groups of digital signals which may be stored in a computer.

Other objects, features and advantages of the present invention will become more apparent in the light of the following detailed description of a preferred embodiment thereof as illustrated in the accompanying drawing.

DESCRIPTION OF THE PREFERRED EMBODIMENT

Figure 1:
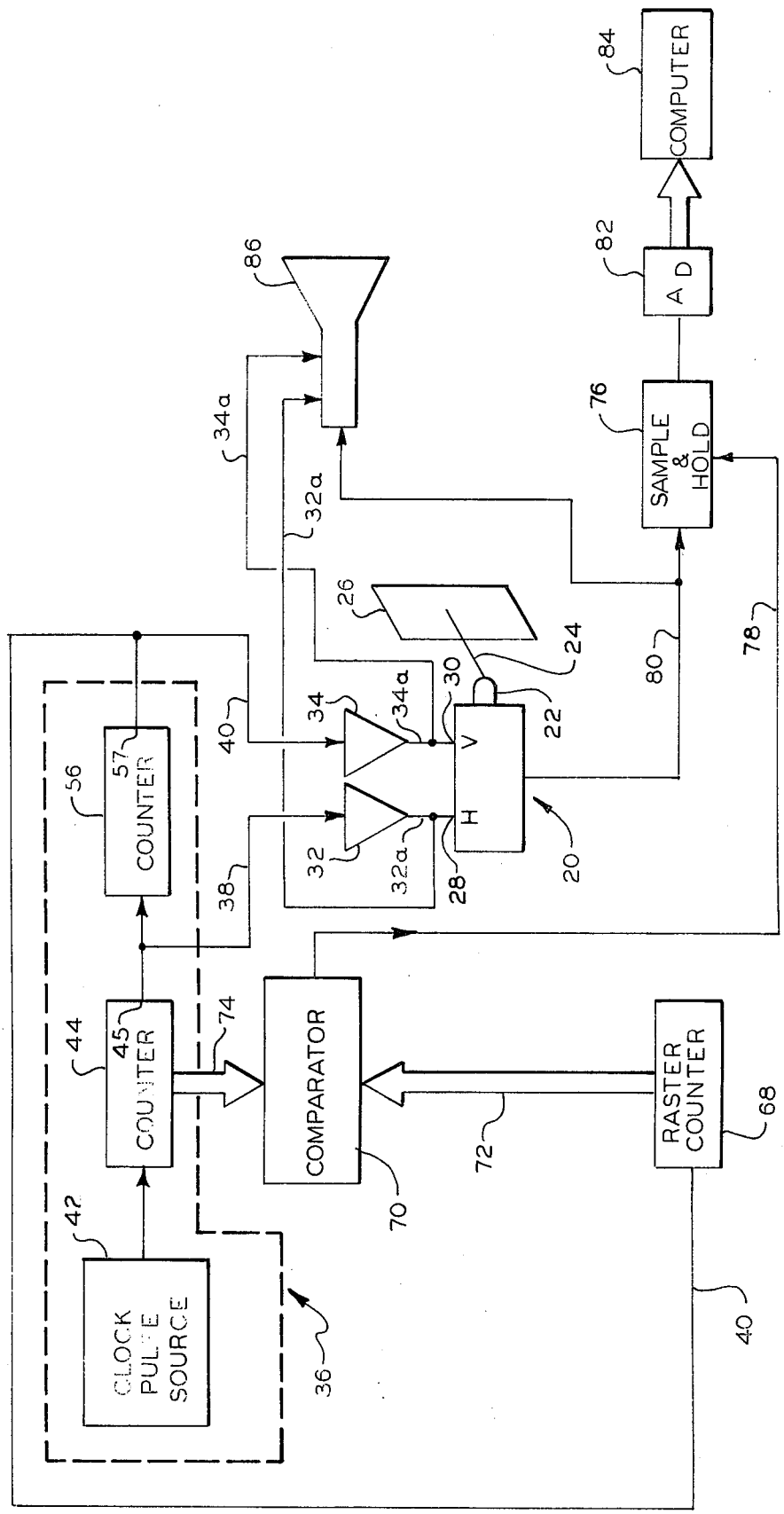
FIG. 1 is a schematic block diagram of a preferred embodiment of the present invention.

Referring now to FIG. 1, a television camera 20 has an optical input 22 which receives light along a line of sight 24 from an element of an image on a film 26. When the camera 20 scans the image the line of sight 24 may be regarded as being deflected to trace rasters on the film 26 whereby the camera 20 provides a video signal representative of an element on a raster line being scanned.

For illustrative purposes, and in order to enable the teaching of the principles of the invention without unduly complicating the details thereof, in an exemplary embodiment disclosed herein, a raster is comprised of sixteen raster lines. As explained hereinafter, an image is represented by ten elements thereof along each raster line.

In accordance with the invention, groups of digital signals respectively representative of one element along each raster line are successively provided to a computer during a first scan of the image. Groups of digital signals respectively representative of another element along each line are successively provided during a second scan of the image. In a similar manner, digital signals representative of eight other elements on each raster line are provided to the computer during successive scans of the image.

The camera 20 scans the image in response to horizontal and vertical deflection voltages provided to a horizontal input 28 and to a vertical input 30, respectively, of the camera 20. The input 28 is connected to the output of a horizontal deflection aplifier 32 through a signal line 32a. The input 30 is connected to the output of a vertical deflection amplifier 34 through a signal line 34a. The amplifiers 32, 34 have inputs connected to a sync pulse generator 36 through signal lines 38, 40, respectively.

The generator 36 provides sync pulses which cause the amplifiers 32, 34 to provide the deflection voltages referred to hereinbefore. The sync pulses and the deflection voltages are described hereinafter.

The generator 36 includes a clock pulse source 42 which alternately provides ONEs and ZEROs at a clock rate. ONE provided by the clock 42 is referred to as a clock pulse. The clock 42 is connected to a horizontal deflection counter 44 at an input thereof whereby clock pulses are provided to the counter 44. Clock pulse sources are well known in the art.

The counter 44 stores logic signals representative of a horizontal deflection number (referred to as a stored horizontal deflection number) which is within a range, 0–10. When the stored horizontal deflection number is within a range, 0–9, the number, one, is added thereto in response to a clock pulse. However, the stored horizontal deflection number, ten, is changed to the stored horizontal deflection number, zero, in response to a clock pulse.

A horizontal sync pulse output 45 of the counter 44 provides ONE when the stored horizontal deflection number is ten, ZERO being provided when the stored horizontal deflection number is in the range, 0 – 9. The provision of ONE by the output 45 is referred to as a horizontal sync pulse. It should be understood that horizontal sync pulses are provided at a constant horizontal sync rate because the clock pulses are provided at the clock rate.

The output 45 is connected to the amplifier 32 through the line 38 whereby the horizontal sync pulses are provided to the amplifier 32.

Figure 2:
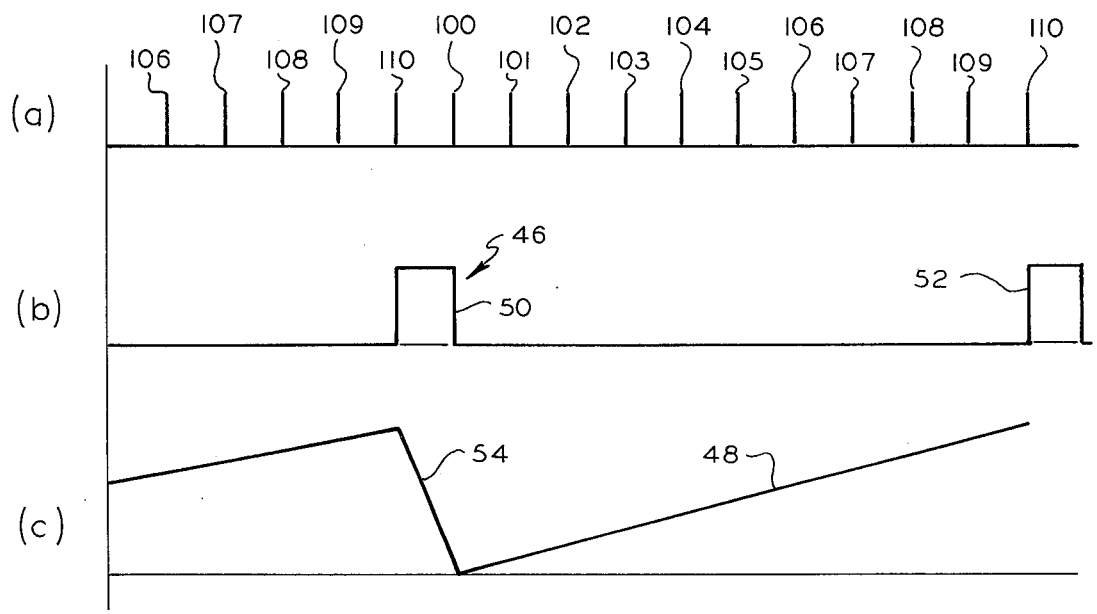
FIG. 2 is a timing diagram of waveforms, all on a common time base, of signals associated with a horizontal deflection of a line of sight in the embodiment of FIG. 1.

Referring now to FIG. 2, illustration (a) is a representation of clock pulses 100 – 110 which cause the counter 44 to the store signal representations of the horizontal deflection numbers, 0 – 10, respectively. Illustration (b) includes a representation of a horizontal sync pulse 46 which occurs in response to the clock pulse 110.

FIG. 2, illustration (c) is a representation of the horizontal deflection voltage having a trace portion 48 which is initiated in response to a trailing edge 50 of the pulse 46 (illustration (b) ). In this embodiment, the trailing edge 50 occurs when the stored horizontal deflection number changes from ten to zero.

The portion 48 is terminated in response to a leading edge 52 of a horizontal sync pulse which occurs after the pulse 46. In this embodiment, the leading edge 52 occurs when the stored horizontal deflection number changes from nine to ten.

The portion 48 is a linearly increasing voltage which causes the line of sight 24 (FIG. 1) to be deflected from the left side to the right side of the film 26 at a constant horizontal deflection rate. Because the clock pulses are provided at the clock rate, and the horizontal deflection of the line of sight 24 is at the horizontal deflection rate, the stored horizontal deflection number corresponds to the horizontal coordinate of a location of an element intersected by the line of sight 24. Therefore, the horizontal deflection numbers collectively represent horizontal coordinates of locations of elements which are successively intersected by the line of sight 24.

When the stored horizontal deflection number is ten, a retrace portion 54 of the horizontal deflection voltage causes a rapid deflection of the line of sight 24 from right to left across the film 26 whereby the line of sight 24 is conditioned to start a trace of a raster line.

The output 45 is additionally connected to a counter 56 at an input thereof through the line 38 whereby the horizontal sync pulses are provided to the counter 56.

The counter 56 stores a logic signal representation of a vertical deflection number (referred to as a stored vertical deflection number) which is within a range, 0–16. When the stored vertical deflection number is within a range, 0–15, the number, one, is added thereto in response to a horizontal sync pulse. However, the stored vertical deflection number, sixteen, is changed to the stored vertical deflection number, zero, in response to a horizontal sync pulse.

A vertical sync pulse output 57 of the counter 56 provides ONE when the stored vertical deflection number is sixteen, ZERO being provided when the stored vertical deflection number is in the range, 0–15. The provision of ONE by the output 57 is referred to as a vertical sync pulse. It should be understood that vertical sync pulses are provided at a constant rate because the horizontal sync pulses are provided at the constant horizontal sync rate.

The output 57 is connected to the amplifier 34 through the line 40 whereby the vertical sync pulses are provided to the amplifier 34. As explained hereinafter, a vertical sync pulse is provided prior to the tracing of a raster.

Figure 3:
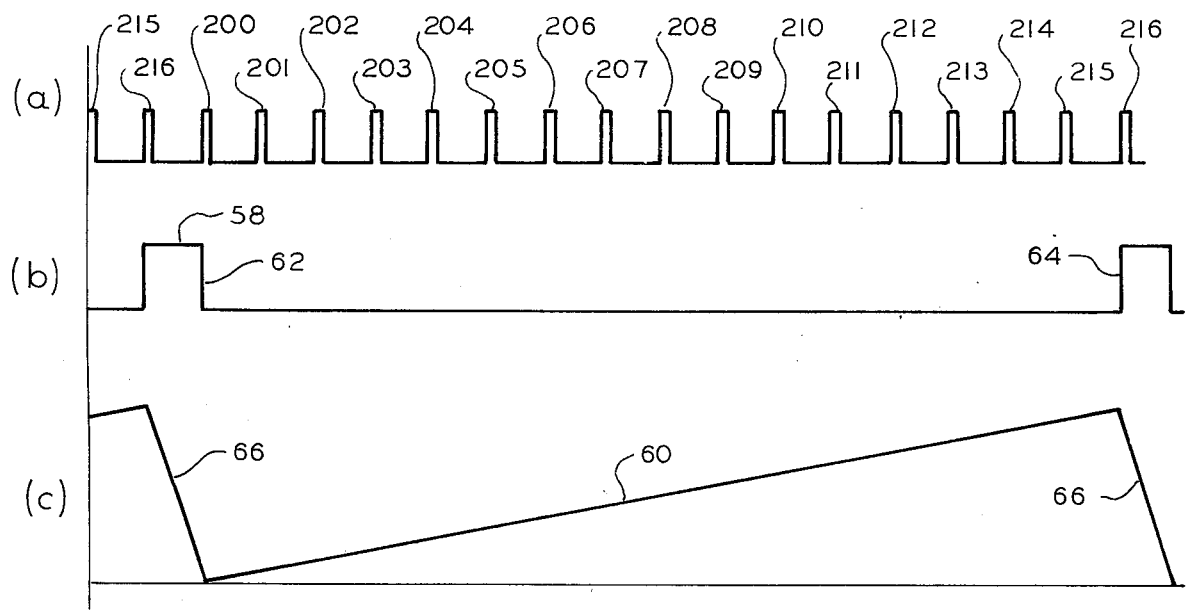
FIG. 3 is a timing diagram of waveforms, all on a common time base, of signals associated with a vertical deflection of the line of sight in the embodiment of FIG. 1.

Referring now to FIG. 3, illustration (a) is a representation of horizontal sync pulses 200 – 216 which cause the counter 56 to store the signal representations of the vertical deflection numbers, 0 – 16, respectively. Illustration (b) includes a representation of a vertical sync pulse 58 which occurs in response to the horizontal sync pulse 216.

FIG. 3, illustration (c) is a representation of the vertical deflection voltage where a trace portion 60 is initiated in response to a trailing edge 62 of the pulse 58 (FIG. 3, illustration (b) ). The trailing edge 62 is concurrent with the counters 44, 56 providing signal representations of horizontal and vertical deflection numbers which change from ten to zero and sixteen to zero, respectively.

The portion 60 is terminated in response to a leading edge 64 of a vertical sync pulse which occurs after the pulse 58.

The portion 60 is a linearly increasing voltage which causes the line of sight 24 (FIG. 1) to be deflected from the top to the bottom of the film 26 at a constant vertical deflection rate during the tracing of a raster.

When the stored vertical deflection number is sixteen, a retrace portion 66 of the vertical deflection voltage causes a rapid deflection of the line of sight 24 from the bottom to the top of the film 26 whereby the line of sight 24 is conditioned to start a trace of a raster. Accordingly, prior to the tracing of a raster, a vertical sync pulse is provided by the counter 56.

The output of the counter 56 is connected to a raster counter 68 (FIG. 1) through a signal line 40. The counter 68 provides a signal representation of a stored raster count equal to the number of vertical sync pulses provided by the counter 56. From the explanation given hereinbefore, the raster count equals the number of times the camera 20 scans the image.

Outputs of the counter 68 are respectively connected to a comparator 70 at a first group of inputs thereof through a plurality of signal lines 72 whereby the signal representation of the stored raster count is provided to the comparator 70. The comparator 70 has a second group of inputs respectively connected to the counter 44 through a plurality of signal lines 74 whereby the signal representation of the stored horizontal deflection number is provided to the comparator 70.

The comparator 70 is a type which provides ONE at an output thereof in response to respectively similar patterns of logic signals being provided to the first and second groups of inputs. Therefore, the comparator 70 provides ONE when the stored horizontal deflection number equals the stored raster count.

During the tracing of a first exemplary raster when the stored raster count equals the number, zero, the comparator 70 provides ONE in response to the line of sight 24 intersecting an element having a horizontal coordinate corresponding to the horizontal deflection number, zero. Since each of the sixteen raster lines has one element having a horizontal coordinate corresponding to the horizontal deflection number, zero, the comparator 70 provides sixteen ONEs, a ONE being provided during the intersecting of one element on each raster line.

After the tracing of the first exemplary raster, a vertical sync pulse causes the raster number to equal the number, one and a second exemplary raster is traced. During the tracing of the second exemplary raster, the comparator 70 provides ONE in response to the line of sight 24 intersecting an element having a horizontal coordinate corresponding to the horizontal deflection number, one. Since each of the sixteen raster lines has one element having a horizontal coordinate corresponding to the horizontal deflection number, one, the comparator 70 provides sixteen ONE's, a ONE being provided during the intersecting of one element of each raster line.

In a similar manner, the comparator provides ONE during the tracing of elements having other horizontal coordinates. It should be understood that the comparator 70 provides successive ONE's with a time interval therebetween slightly greater than the time for the tracing of a raster line (referred to as a line time).

The output of the comparator 70 is connected to a sample and hold circuit 76 at a gate input thereof through a signal line 78. Additionally connected to the sample and hold 76 at a video input thereof is the output of the camera 20 through a signal line 80 whereby the video signal is provided to the sample and hold 76.

In response to the comparator 70 providing ONE to the gate input, the sample and hold 76 stores a sampled video signal having an amplitude substantially equal to the amplitude of the camera video signal. Because the comparator 70 provides ONEs with an interval therebetween equal to the line time, the sampled video signal remains unchanged for a duration equal to the line time. Sample and hold networks are well known to those skilled in the art.

In accordance with the explanation given hereinbefore, in response to the image being scanned ten times by the camera 20, the sample and hold 76 successively stores sampled video signals respectively representative of ten elements on each raster line.

The sample and hold 76 is connected to an analog to digital converter 82 at an input thereof whereby the sampled video signals are applied to the input of the converter 82. The converter 82 provides a group of converter digital signals representative of the amplitude of an applied input signal. The converter digital signals are provided after a conversion time following the application of the input signal.

According to the present invention, because a sampled video signal remains unchanged for a duration equal to the line time, the converter 82 may have a conversion time equal in duration to the line time.

The converter 82 is connected to a computer 84 whereby the converter digital signals are provided to the computer 84.

The computer 84 successively stores the converter digital signals thereby storing a signal representation of the image on the film 26.

The video signal, the horizontal sync pulses, and the vertical sync pulses may be provided to a television monitor display 86 through the lines 80, 32a, 34a, respectively. The display 86 is utilized to provide a visual representation of the image on the film 26.

Although the invention has been shown and described with respect to a preferred embodiment thereof, it should be understood by those skilled in the art that changes and omissions in the form thereof may be made therein without departing from the spirit and the scope of the invention.

Having thus described a typical embodiment of my invention, that which I claim as new and desire to secure by Letters Patent of the United States is:

1. In apparatus for providing groups of digital signals respectively representative of elements of an image on an image bearing medium being scanned by a video generator which generates a video signal having an amplitude representative of an element being scanned, said scanning being in response to deflection signals provided to said generator by a deflection circuit which stores digital signals representative of a coordinate of the location of said element being scanned, the improvement comprising:

a raster counter connected to said deflection circuit for providing count signals representative of a number of times said generator scans said image;

comparison means connected to said deflection circuit and to said raster counter for providing a gating signal when said count signals have a known relationship to said coordinate;

storage means connected to said comparison means and said generator for storing the video signal representative of said element being scanned when said gating signal is provided; and an analog to digital converter having an input connected to said storage means, said converter providing a group of said digital signals in response to the video signal representative of said element being scanned.

\* \* \* \* \*